W. R. KLECKNER.
DEVICE FOR APPLYING SUBSTANCES TO TREES, SHRUBS, AND VINES.
APPLICATION FILED SEPT. 6, 1916.
1,240,733.
Patented Sept. 18, 1917.
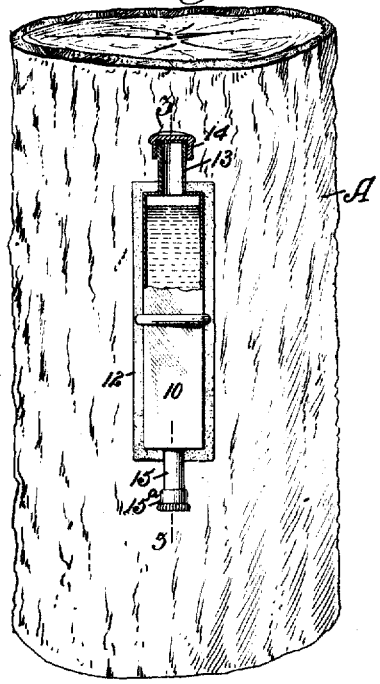
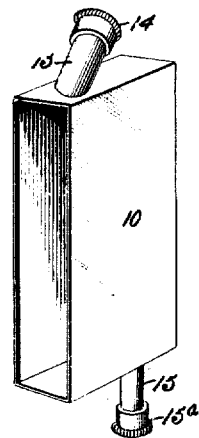
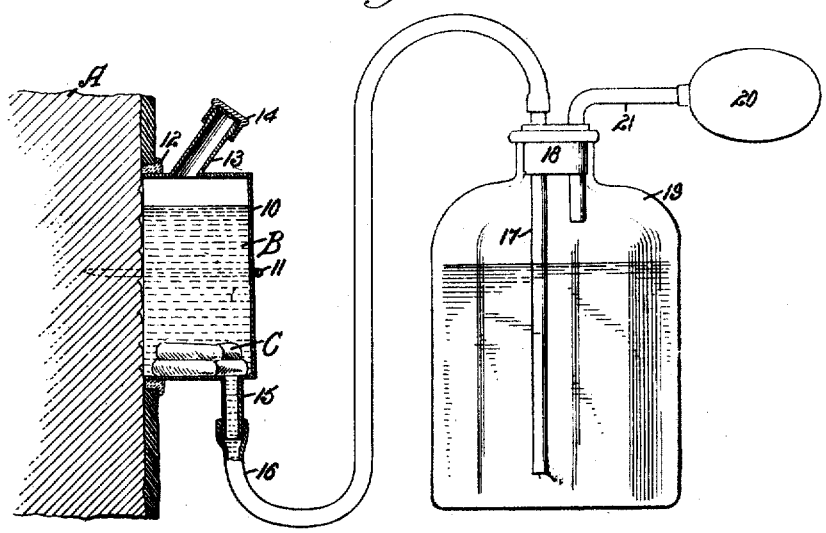
WITNESSES
INVENTOR
William R. Kleckner
BY Munn & Co
ATTORNEYS

UNITED STATES PATENT OFFICE.

WILLIAM RENATUS KLECKNER, OF COWELL, CALIFORNIA.

DEVICE FOR APPLYING SUBSTANCES TO TREES, SHRUBS, AND VINES.

1,240,733.  Specification of Letters Patent.  Patented Sept. 18, 1917.

Application filed September 6, 1916. Serial No. 118,651.

*To all whom it may concern:*

Be it known that I, WILLIAM R. KLECKNER, a citizen of the United States, and a resident of Cowell, in the county of Contra Costa and State of California, have invented a new and Improved Device for Applying Substances to Trees, Shrubs, and Vines, of which the following is a full, clear, and exact description.

My invention relates to a means whereby an insecticide or other substance may be so applied to a tree, shrub or vine as to readily enable the sap in the latter to take up said substance.

The present invention is an improvement on a device for the indicated purpose forming the subject matter of United States Letters Patent, No. 1,080,460, granted to me December 2, 1913.

My improved device forming the subject of the present application is adapted to be applied to a tree at the sap wood thereof after removing the bark to the necessary extent to accommodate the device, and the container body of the device is provided with means for the entrance of the substance to be applied so that the said substance may be introduced into the device after the latter has been applied to the tree and sealed thereon.

In carrying out the invention in practice, use is made of a container having plain, unflanged sides for direct edge contact with the sap wood, the applied edge being then sealed with a suitable sealing glue. The container body has threaded necks at the top and bottom adapted to receive caps for closing same. Capsules of other solid or semi-solid material are adapted to be introduced through the upper neck into water or the like, with which the container body is charged, to be dissolved in said water. The lower neck, when the cap is removed, is adapted to receive a connecting tube or siphon so that the material for the treating of the tree is introduced through the container in the form of a solution by siphon action or pump, the upper neck serving in such case as a vent. The device thus provides a means for supplying a tree with chemicals introduced into the device in the form of a solid or in solution as soon as symptoms of disease, insect attacks, or lack of proper nourishment or sufficient moisture become apparent. The device permits of the tree being treated periodically at suitable intervals or continuously for periods extending over several days.

Reference is to be had to the accompanying drawings forming a part of this specification in which similar reference characters indicate corresponding parts in all the views.

Figure 1 is a face view with parts broken out, showing my device applied.

Fig. 2 is a perspective view of the device;

Fig. 3 is a sectional side elevation showing the device applied.

The device includes an oblong, preferably rectangular container 10, open at the front. The sides and top of the container body extend in flat unflanged form for direct edge contact with the sap wood of a tree A after the bark has been removed from the latter to a sufficient extent as indicated in Fig. 3.

The body is secured in position by a staple 11 embracing the body and projecting beyond the front end thereof sufficiently to penetrate the tree. With the container body thus stapled in position, a sealing glue, as indicated at 12, is applied about the container body at the front thereof between the sides of the body and the opposed edges of the bark.

On the body 10 at the upper end is a neck 13 which advantageously is disposed at an angle so as to incline toward the closed back of the body and the upper end of said neck is threaded to receive a screw cap 14.

At the lower end a depending neck 15 extends from the bottom of the body 10. Said neck is adapted to receive a screw cap 15ᵃ as in Figs. 1 and 2, or have applied thereto the end of a tube 16. The tube 16 may constitute the leg of a siphon, the other leg of which is in the form of a tube 17 extending through the stopper 18 of a bottle or fluid container 19, to near the bottom of the latter. An air pump 20 may be connected, after the manner of an atomizer, with a pipe 21 extending through the stopper 18 into said bottle.

With the described construction, the body 10 is charged with water or other liquid as indicated at B, Fig. 3, and capsules C may be dropped into the container through the upper neck 13 to be dissolved in the liquid B, the cap 15ᵃ being applied when employing capsules to supply the desired substance for treatment of the tree. Instead of using capsules, a solution of the substance to be applied may be pumped from the bottle 19 through the lower neck 15 or the solution siphoned from said bottle to the container 19. With the filler necks arranged in connection with the top and bottom of the container, said necks are better protected against the contact of other objects than if they projected laterally at the front and sides.

Having thus described my invention I claim as new, and desire to secure by Letters Patent:—

A device for applying a substance to a tree, shrub, or vine, including a container adapted to hold the substance to be applied, and being open at the front end for the application of the substance to the surface to be treated, a capped filling neck on the top of the body and rising from said top, and an inlet neck depending from the bottom of the body and within the sides thereof adapted for connection with a supply tube.

WILLIAM RENATUS KLECKNER.